United States Patent
Kurihara et al.

(10) Patent No.: US 6,877,317 B2
(45) Date of Patent: Apr. 12, 2005

(54) SUPERCHARGING APPARATUS FOR AN ENGINE

(75) Inventors: Hirokazu Kurihara, Kanagawa (JP); Masahiro Noguchi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 71 days.

(21) Appl. No.: 10/694,059

(22) Filed: Oct. 28, 2003

(65) Prior Publication Data

US 2004/0088978 A1 May 13, 2004

(30) Foreign Application Priority Data

Nov. 13, 2002 (JP) ........................................ 2002-329031

(51) Int. Cl.[7] ........................ F02B 33/44; F02B 37/013
(52) U.S. Cl. ...................................................... 60/612
(58) Field of Search .......................................... 60/612

(56) References Cited

U.S. PATENT DOCUMENTS

| | | | | |
|---|---|---|---|---|
| 4,400,945 A | * | 8/1983 | Deutschmann et al. | ........ 60/612 |
| 5,142,866 A | | 9/1992 | Yanagihara et al. | |
| 5,199,261 A | * | 4/1993 | Baker | ........................ 60/612 |
| 5,692,378 A | * | 12/1997 | Ramsden | ..................... 60/612 |
| 5,697,217 A | * | 12/1997 | Ramsden et al. | ............. 60/612 |
| 6,324,846 B1 | | 12/2001 | Clarke | |
| 2003/0159442 A1 | * | 8/2003 | Huter et al. | .................. 60/612 |

FOREIGN PATENT DOCUMENTS

| | | | | |
|---|---|---|---|---|
| DE | 10015291 A1 | * | 10/2001 | ......... F02B/37/013 |
| DE | 10144663 A1 | * | 4/2003 | ......... F02B/37/013 |
| EP | 718481 A2 | * | 6/1996 | ......... F02B/37/013 |
| EP | 1 101 917 A2 | | 5/2001 | |
| GB | 1 345 305 | | 1/1974 | ........... F02B/37/02 |
| JP | 2001140653 A | * | 5/2001 | ................... 60/612 |

OTHER PUBLICATIONS

European Search Report dated Dec. 30, 2003.

* cited by examiner

*Primary Examiner*—Thomas Denion
*Assistant Examiner*—Thai-Ba Trieu

(57) ABSTRACT

A supercharging apparatus for an engine comprising a high-pressure stage supercharger having a high-pressure stage turbine arranged in an exhaust gas passage of the engine and a high-pressure stage compressor that is arranged in an intake gas passage of the engine and is driven by the high-pressure stage turbine, and a low-pressure stage supercharger having a low-pressure stage turbine arranged in the exhaust gas passage on the downstream side of the high-pressure stage turbine and a low-pressure stage compressor that is arranged in the intake air passage on the upstream side of the high-pressure stage compressor and is driven by the low-pressure stage turbine, wherein the low-pressure stage compressor has a capacity larger than a capacity of the high-pressure stage compressor, and the low-pressure stage turbine has a capacity equal to, or smaller than, a capacity of the high-pressure stage turbine.

1 Claim, 1 Drawing Sheet

SUPERCHARGING APPARATUS FOR AN ENGINE

FIELD OF THE INVENTION

The present invention relates to a so-called two-stage supercharging apparatus in which a high-pressure stage supercharger and a low-pressure stage supercharger are arranged in series in an exhaust gas passage and in an intake air passage of an engine.

DESCRIPTION OF THE RELATED ART

There has been widely put into practical use a supercharger, which operates the turbine by utilizing the exhaust gas energy of an engine and supercharges the intake air by a compressor which is driven by the turbine, and there has been also known a so-called two-stage supercharging apparatus in which superchargers are arranged in series to efficiently recover the energy of exhaust gas. The two-stage supercharging apparatus comprises a high-pressure stage supercharger that has a high-pressure stage turbine arranged in the exhaust gas passage of the engine and a high-pressure stage compressor that is arranged in the intake gas passage of the engine and is driven by the high-pressure stage turbine, and a low-pressure stage supercharger that has a low-pressure stage turbine arranged in the exhaust gas passage on the downstream side of the high-pressure stage turbine and a low-pressure stage compressor that is arranged in the intake air passage on the upstream side of the high-pressure stage compressor and is driven by the low-pressure stage turbine, as disclosed in, for example, JP-A 2001-140653.

The above two-stage supercharging apparatus has a prerequisite of using a turbo-charger comprising a turbine and a compressor of small capacities as the high-pressure stage supercharger, and a turbo-charger comprising a turbine and a compressor of large capacities as the low-pressure stage supercharger. That is, when the two-stage supercharging apparatus is in operation, the high-pressure stage compressor has an inlet pressure which is higher than that of the low-pressure stage compressor. Therefore, a corrected mass flow at atmospheric condition (=(mass flow×√(inlet temperature/atmospheric temperature)÷(inlet pressure/atmospheric pressure)) at a compressor operation point becomes small in the high-pressure stage and becomes large in the low-pressure stage. Accordingly, it is a matter of course that the high-pressure stage compressor has a capacity smaller than that of the low-pressure stage compressor. On the other hand, as for the turbine, too, it is quite natural that the high-pressure stage turbine has a small capacity and the low-pressure stage turbine has a large capacity to maintain balance relative to the capacities of the compressors. To improve response characteristics of the turbo-chargers in the above two-stage supercharging apparatus, it is a generally accepted practice to further decrease the capacity of the high-pressure stage turbine and to use, chiefly, a high-pressure stage supercharger at the time of low-speed operation so as to increase the supercharging pressure, while, to allow the exhaust gas to by-pass to introduce it into the low-pressure stage turbine and to use, chiefly, the low-pressure stage supercharger of the large capacity at the time of high-speed operation, thereby to prevent over-running of the high-pressure stage supercharger.

When it is attempted to further increase the supercharging pressure in the two-stage supercharging apparatus, a decrease in the capacities of the turbines while maintaining a relationship between the high-pressure stage turbine capacity and the low-pressure stage turbine capacity (high-pressure stage turbine capacity<low-pressure stage turbine capacity), results in an increase in the pressure ratio (inlet pressure of turbine/outlet pressure of turbine) of the high-pressure stage turbine, in an increase in the back pressure, in an increase in the pumping loss and hence, in a decrease in the fuel efficiency. Further, as the pressure ratio of the high-pressure stage turbine increases and the back pressure increases, there is obtained no effect for improving the turbine efficiency of the high-pressure stage turbine based on the pulsation of exhaust gas. Accordingly, the turbine efficiency decreases, the pumping loss increases, and hence, the fuel efficiency decreases. The conditions for increasing the turbine efficiency based on the pulsation of exhaust gas are that the pulsation of exhaust gas is strong and that the turbine pressure ratio calculated based on average pressures is small. Therefore, if the turbine capacity is decreased to further increase the supercharging pressure as described above, the pressure ratio of the high-pressure stage turbine becomes so great that there is obtained no effect for improving the turbine efficiency of the high-pressure stage turbine based on the pulsation of exhaust gas.

SUMMARY OF THE INVENTION

It is an object of the present invention to provide a supercharging apparatus for an engine of the two-stage supercharging type which suppresses an increase in the back pressure of the engine, secures the effect for improving the high-pressure stage turbine efficiency based on the pulsation of exhaust gas, and increases the supercharging pressure.

The present invention has been accomplished based on a discovery that the high-pressure stage turbine in the two-stage supercharging apparatus is affected by the pulsation of exhaust gas, but the exhaust gas that acts on the low-pressure stage turbine after having passed through the high-pressure stage turbine, has no pulsation.

That is, according to the present invention, for achieving the above object, there is provided a supercharging apparatus for an engine comprising:

a high-pressure stage supercharger having a high-pressure stage turbine arranged in an exhaust gas passage of the engine and a high-pressure stage compressor that is arranged in an intake gas passage of the engine and is driven by the high-pressure stage turbine; and a low-pressure stage supercharger having a low-pressure stage turbine arranged in the exhaust gas passage on the downstream side of the high-pressure stage turbine and a low-pressure stage compressor that is arranged in the intake air passage on the upstream side of the high-pressure stage compressor and is driven by the low-pressure stage turbine, wherein:

the low-pressure stage compressor has a capacity larger than a capacity of said high-pressure stage compressor, and the low-pressure stage turbine has a capacity equal to, or smaller than, a capacity of the high-pressure stage turbine.

DETAILED DESCRIPTION OF THE PREFERRED EMBODIMENT

Figure 1:
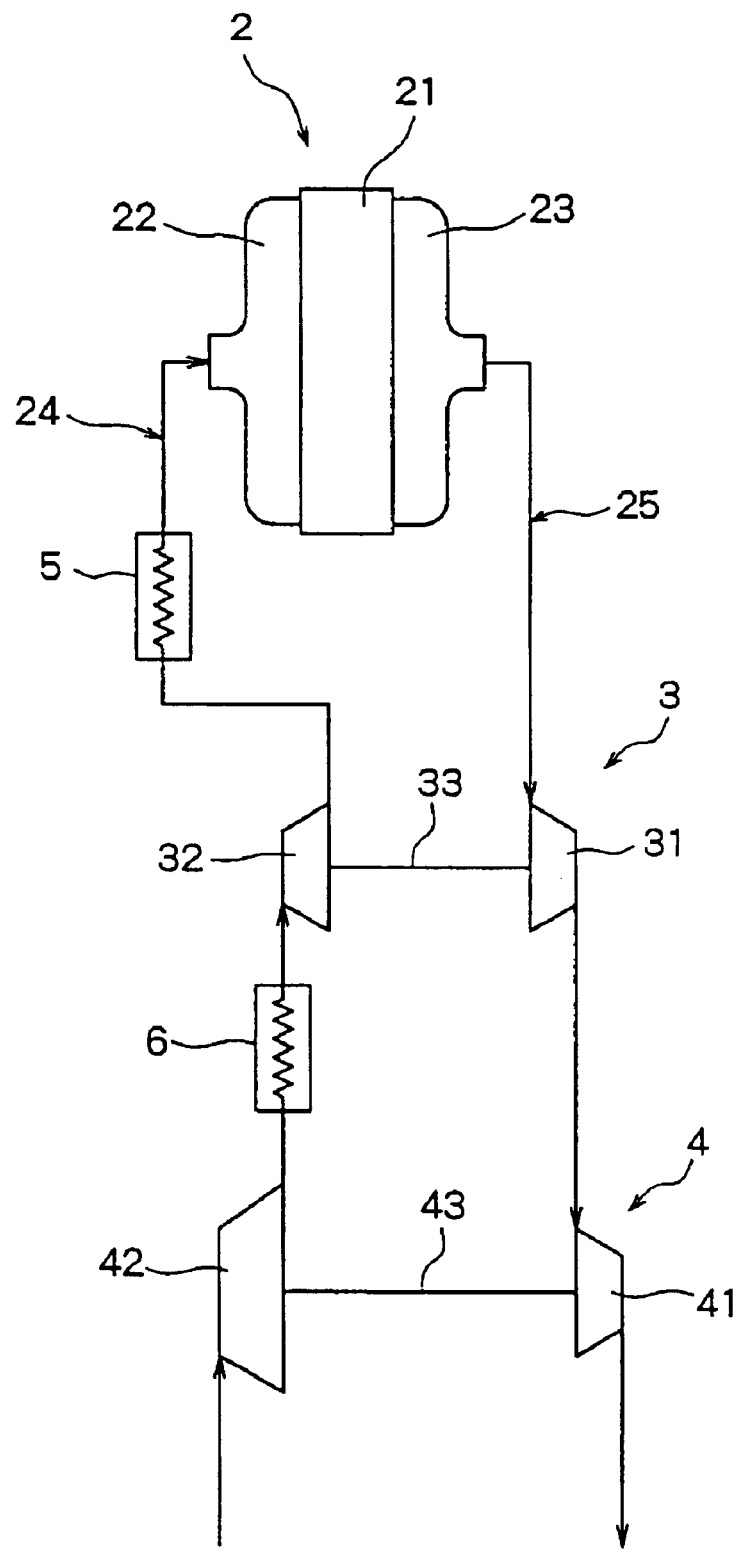
FIG. 1 is a block diagram illustrating the constitution of a supercharging apparatus for an engine constituted according to the present invention.

A preferred embodiment of a supercharging apparatus for an engine constituted according to the present invention will now be described in further detail with reference to the accompanying drawing.

FIG. 1 is a block diagram illustrating the constitution of a supercharging apparatus for an engine constituted according to the present invention.

The engine 2 in the illustrated embodiment is a diesel engine which comprises an engine body 21, an intake manifold 22 and an exhaust manifold 23. An intake air passage 24 is connected to the intake manifold 22, and an exhaust gas passage 25 is connected to the exhaust gas manifold 23. A high-pressure stage supercharger 3 and a low-pressure stage supercharger 4 are arranged in series in the intake air passage 24 and in the exhaust gas passage 25. The high-pressure stage supercharger 3 comprises a high-pressure stage turbine 31 arranged in the exhaust gas passage 25, a high-pressure stage compressor 32 arranged in the intake air passage 24, and a rotary shaft 33 coupling the high-pressure stage turbine 31 to the high-pressure stage compressor 32. The low-pressure stage supercharger 4 comprises a low-pressure stage turbine 41 arranged in the exhaust gas passage 25 on the downstream side of the high-pressure stage turbine 31, a low-pressure stage compressor 42 arranged in the intake air passage 24 on the upstream side of the high-pressure stage compressor 32, and a rotary shaft 43 coupling the low-pressure stage turbine 41 to the low-pressure stage compressor 42. A relationship of the capacities between the high-pressure stage turbine 31 and the high-pressure stage compressor 32 constituting the high-pressure stage supercharger 3 and a relationship of the capacities between the low-speed stage turbine 41 and the low-speed stage compressor 42 constituting the low-pressure stage supercharger 4 will be described later in detail. In the illustrated embodiment, a high-pressure stage charge cooler 5 is arranged in the intake air passage 25 connecting the high-pressure stage compressor 32 to the intake manifold, and a low-pressure stage charge cooler 6 is arranged in the intake air passage 25 connecting the low-pressure stage compressor 42 to the high-pressure stage compressor 32.

Next, described below is the operation of the supercharging apparatus for the engine.

The exhaust gas emitted from the exhaust port of the engine body 21 into the exhaust gas passage 25 through the exhaust manifold 23 works to operate the high-pressure stage turbine 31 in the high-pressure stage supercharger 3 and further works to operate the low-pressure stage turbine 41 in the low-pressure stage supercharger 4. On the other hand, the intake air of which pressure has been raised by the low-pressure stage compressor 42 that is driven by the low-pressure stage turbine 41, passes through the low-pressure stage charge cooler 6. Then, after its supercharging pressure is further boosted by the high-pressure stage compressor 32 driven by the high-pressure stage turbine 31, the intake air passes through the high-pressure stage charge cooler 5 and is supplied to the engine body 21. On this occasion, if the capacities of the high-pressure stage turbine and the low-pressure stage turbine are decreased in an attempt to raise the supercharging pressure, the pressure ratio of the high-pressure stage turbine increases as described above, whereby the back pressure increases, the pumping loss increases, and there is obtained no effect for improving the turbine efficiency of the high-pressure stage turbine based on the pulsation of exhaust gas. Accordingly, the turbine efficiency drops, pumping loss increases and consequently, the fuel efficiency is deteriorated.

According to the present invention, in order to solve the above problems, a relationship of the capacities between the high-pressure stage turbine 31 and the high-pressure stage compressor 32 constituting the high-pressure stage supercharger 3 and a relationship of the capacities between the low-pressure stage turbine 41 and the low-pressure stage compressor 42 constituting the low-pressure stage supercharger 4, are set as described below. Namely, the capacity of the low-pressure stage compressor 42 is set to be larger than the capacity of the high-pressure stage compressor 32, and the capacity of the low-pressure stage turbine 41 is set to be equal to, or smaller than, the capacity of the high-pressure stage turbine 31. In the supercharging apparatus in which the capacity of the high-pressure stage supercharger 3 and the capacity of the low-pressure stage supercharger 4 are set to a predetermined relationship, for example, the supercharging pressure can be further increased by decreasing the capacity of the low-pressure stage turbine 41 so that it is set to be equal to, or smaller than, the capacity of the high-pressure stage turbine 31, without decreasing the capacity of the high-pressure stage turbine 31. That is, since the capacity of the high-pressure stage turbine 31 is not decreased, the pressure ratio of the high-pressure stage turbine does not increase, making it possible to suppress an increase in the back pressure as well as to maintain the effect for improving the turbine efficiency of the high-pressure stage turbine based on the pulsation of exhaust gas. The low-pressure stage turbine 41, on the other hand, is not affected by the pulsation of exhaust gas and its turbine efficiency does not change so much even though its pressure ratio is increased. Accordingly, the supercharging pressure can be elevated by decreasing the capacity of the low-pressure stage turbine 41.

The supercharging apparatus for the engine according to the present invention is constituted as described above, and exhibits action and effect as described below.

Namely, the capacity of the low-pressure stage compressor of the low-pressure stage supercharger is set to be larger than the capacity of the high-pressure stage compressor of the high-pressure stage supercharger, and the capacity of the low-pressure stage turbine of the low-pressure stage supercharger is set to be equal to, or smaller than, the capacity of the high-pressure stage turbine of the high-pressure stage supercharger. Therefore, the pressure ratio of the high-pressure stage turbine does not increase and consequently, it make possible to suppress an increase in the back pressure and to maintain the effect for improving the turbine efficiency of the high-pressure stage turbine based on the pulsation of exhaust gas. The low-pressure stage turbine, on the other hand, is not affected by the pulsation of exhaust gas and its turbine efficiency does not change so much even though its pressure ratio is increased. Accordingly, the supercharging pressure can be elevated by decreasing the capacity of the low-pressure stage turbine, i.e., the supercharging pressure can be elevated without being accompanied by an increase in the pumping loss, and the fuel efficiency can be improved.

We claim:

1. A supercharging apparatus for an engine comprising:

a high-pressure stage supercharger having a high-pressure stage turbine arranged in an exhaust gas passage of the engine and a high-pressure stage compressor that is arranged in an intake gas passage of the engine and is driven by said high-pressure stage turbine; and a low-pressure stage supercharger having a low-pressure stage turbine arranged in said exhaust gas passage on the downstream side of said high-pressure stage turbine and a low-pressure stage compressor that is arranged in said intake air passage on the upstream side of said high-pressure stage compressor and is driven by said low-pressure stage turbine, wherein:

said low-pressure stage compressor has a capacity larger than a capacity of said high-pressure stage compressor, and said low-pressure stage turbine has a capacity equal to, or smaller than, a capacity of said high-pressure stage turbine.

* * * * *